(12) United States Patent
Yeo et al.

(10) Patent No.: US 12,280,778 B2
(45) Date of Patent: *Apr. 22, 2025

(54) APPARATUS FOR CONTROLLING SPEED OF VEHICLE AND METHOD FOR THE SAME

(71) Applicants: Kia Corporation, Seoul (KR); Hyundai Motor Company, Seoul (KR)

(72) Inventors: Sung Yoon Yeo, Seoul (KR); Seo Hyeon Park, Suwon-si (KR); Young Min Han, Gunpo-si (KR); Seung Geon Moon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 274 days.

This patent is subject to a terminal disclaimer.

(21) Appl. No.: 18/049,572

(22) Filed: Oct. 25, 2022

(65) Prior Publication Data

US 2023/0398987 A1 Dec. 14, 2023

(30) Foreign Application Priority Data

Jun. 9, 2022 (KR) .................. 10-2022-0070236

(51) Int. Cl.
*B60W 30/14* (2006.01)

(52) U.S. Cl.
CPC ....... *B60W 30/146* (2013.01); *B60W 2520/10* (2013.01); *B60W 2520/105* (2013.01); *B60W 2555/60* (2020.02); *B60W 2720/10* (2013.01)

(58) Field of Classification Search
CPC ........... B60W 30/146; B60W 2520/10; B60W 2520/105; B60W 2555/60; B60W 2720/10; B60W 2720/106; B60W 2556/45; B60W 2556/50; B60W 40/105; B60W 40/107; B60W 2554/802
USPC ........................................................ 701/93
See application file for complete search history.

(56) References Cited

U.S. PATENT DOCUMENTS

| | | | |
|---|---|---|---|
| 8,896,464 B2* | 11/2014 | Khachaturian | G01C 21/3697 340/936 |
| 10,424,200 B2* | 9/2019 | Peng | F02D 41/123 |
| 11,498,557 B2* | 11/2022 | Knoller | B60W 30/18145 |
| 2002/0022920 A1* | 2/2002 | Straub | B60K 31/0058 180/170 |
| 2015/0105993 A1* | 4/2015 | Um | B60W 30/146 701/93 |
| 2017/0088117 A1* | 3/2017 | Ogawa | B60L 58/15 |
| 2017/0205242 A1* | 7/2017 | Schmidt | H04W 4/40 |
| 2019/0193732 A1* | 6/2019 | Huh | B60W 30/18072 |
| 2019/0291735 A1* | 9/2019 | Park | B60W 30/18072 |

(Continued)

*Primary Examiner* — Andrew R Dyer
(74) *Attorney, Agent, or Firm* — Slater Matsil, LLP

(57) ABSTRACT

In an embodiment an apparatus includes a communication device configured to receive at least one of a starting point of a speed trap, an end point of the speed trap, a speed limit in the speed trap, an average speed of the vehicle, a traveling distance from the starting point of the speed trap of the vehicle, or a present speed of the vehicle, a target speed setting device configured to set a target point, to set a starting point for a target speed, and to calculate the target speed, a required acceleration calculating device configured to calculate a required acceleration, and a controller configured to control the vehicle based on at least one of the calculated target speed or the calculated required acceleration.

18 Claims, 8 Drawing Sheets

(56) References Cited

U.S. PATENT DOCUMENTS

2022/0306162 A1\* 9/2022 Kawano ............ B60W 60/0053
2022/0307842 A1\* 9/2022 Seta ....................... G01C 21/32

\* cited by examiner

APPARATUS FOR CONTROLLING SPEED OF VEHICLE AND METHOD FOR THE SAME

CROSS-REFERENCE TO RELATED APPLICATIONS

This application claims the benefit of priority to Korean Patent Application No. 10-2022-0070236, filed in the Korean Intellectual Property Office on Jun. 9, 2022, the entire contents of which are incorporated herein by reference.

TECHNICAL FIELD

The present disclosure relates to an apparatus for controlling the speed of a vehicle in a speed trap, and a method for the same.

BACKGROUND

Over speed enforcement per section may be performed with respect to a vehicle traveling on various roads such as a higher-speed national road.

In the speed trap, the vehicle is a target of speed limit enforcement not only when the instantaneous speed of the vehicle exceeds a speed limit at a starting point of the speed trap or an end point of the speed trap, but also when an average speed from the starting point of the speed trap to the end point of the speed trap exceeds the speed limit in the speed trap.

According to a related art, when the average speed of the vehicle is greater than the speed limit in the speed trap, the speed of the vehicle is controlled such that the average speed of the vehicle is equal to or less than the speed limit, regardless of the remaining distance of the speed trap.

According to such a manner of adjusting the average speed of the vehicle regardless of the remaining distance of the speed trap, as the vehicle is accelerated when the average speed is equal to or less than the speed limit, after the speed of the vehicle is unnecessarily decelerated to be less than the speed limit even if a longer distance remains till the end point of the speed trap, energy may be consumed and the user may feel disharmony.

SUMMARY

Embodiments solve the above-mentioned problems occurring in the prior art while advantages achieved by the prior art are maintained intact.

Embodiments provide an apparatus for controlling a speed of a vehicle and a method for the same, capable of controlling the vehicle to follow a speed limit based on an acceleration of the vehicle, which is calculated based on a traveling distance from a starting point of a speed trap, as well as the average speed of the vehicle.

Further embodiments provide an apparatus for controlling the speed of a vehicle, and a method for the same, capable of setting, as a target point, a point toward a starting point of a speed trap from an end point of the speed trap by a margin distance, and controlling the vehicle such that the average speed of the vehicle is equal to or less than a speed limit of the speed trap at a target point, thereby improving the inefficient use of the energy according to a related art of making the average speed of the vehicle to be less than or equal to the speed limit of the vehicle and then accelerating the vehicle, such that the energy is efficiently used, and the disharmony felt by the user is lowered.

Yet other embodiments provide an apparatus for controlling the speed of a vehicle, and a method for the same, capable of setting, as a starting point for maintaining a target speed, a point spaced to a starting point of a speed trap from a target point by a first distance, such that the vehicle maintains the speed of the vehicle after passing through the starting point for maintaining the target speed, thereby providing a stable driving experience to a user.

Another aspect of the present disclosure provides an apparatus for controlling the speed of a vehicle, and a method for the same, capable of consecutively calculating a target speed, based on at least one of a target distance, which is a distance extending from a starting point of a speed trap to a target point, a traveling distance from the starting point of the speed trap, an average speed of a vehicle, or a remaining distance which is a distance from a present position of the vehicle to a target point, thereby precisely controlling the average speed of the vehicle.

Various embodiments provide an apparatus for controlling the speed of a vehicle and a method for the same, capable of setting a lower limit of a target speed as a target speed to ensure the safety of the user, when a calculated target speed has a positive value less than the lower limit of the target speed.

The technical problems to be solved by the present disclosure are not limited to the aforementioned problems, and any other technical problems not mentioned herein will be clearly understood from the following description by those skilled in the art to which the present disclosure pertains.

According to an embodiment of the present disclosure, an apparatus for controlling a speed of a vehicle may include a communication device to receive at least one of a starting point of a speed trap, an end point of the speed trap, a speed limit in the speed trap, an average speed of the vehicle, a traveling distance from the starting point of the speed trap of the vehicle, or a present speed of the vehicle, a target speed setting device to set a starting point for maintaining a target speed, based on the set target point, and to calculate the target speed, based on at least one of the starting point of the speed trap, the speed limit, the average speed, the traveling distance from the starting point of the speed trap, or the set target point, a required acceleration calculating device to calculate the required acceleration, based on the calculated target speed, the speed limit, a lower limit of the target speed, or the present speed of the vehicle, and a controller to control the vehicle, based on at least one of the calculated target speed or the calculated required acceleration.

According to an embodiment, the target speed setting device may set, as the target point, one of a point spaced apart toward the starting point of the speed trap from the end point of the speed trap by a margin distance or the end point of the speed trap.

According to an embodiment, the target speed setting device may set, as the starting point for maintaining the target speed, one of a point spaced apart toward the starting point of the speed trap from the target point by the first distance, or the target point.

According to an embodiment, the required acceleration calculating device may calculate the required acceleration, based on at least one of the speed limit or the present speed of the vehicle, and the controller may control at least one of the speed limit or the calculated required acceleration when the target point may not be set, based on the end point of the speed trap.

According to an embodiment, the required acceleration calculating device may calculate a required acceleration, based on at least one of a target speed calculated before the vehicle passes through the starting point for maintaining the target speed or the present speed of the vehicle, and the controller may control the vehicle, based on at least one of the target speed or a required acceleration, calculated before the vehicle passes through the starting point for maintaining the target speed, when the vehicle is determined as passing through the starting point for maintaining the target speed.

According to an embodiment, the target speed setting device may determine the vehicle as passing through the starting point for maintaining the target speed, when a value, which is obtained by subtracting the traveling distance extending from the starting point of the speed trap, from a whole distance of the speed trap, is equal to or less than the distance extending from the starting point for maintaining the target speed to the end point of the speed trap.

According to an embodiment, the target speed setting device may calculate the target speed based on at least one of i) a value obtained by dividing a target distance including a distance from the starting point of the speed trap to the set target point, by a speed limit, ii) a value obtained by dividing the traveling distance from the starting point of the speed trap by the average speed, or iii) a remaining distance including a distance from the present position of the host vehicle to the set target point.

According to an embodiment, the required acceleration calculating device may calculate a required acceleration, based on at least one of the speed limit or the present speed of the vehicle, and the controller may control the vehicle, based on at least one of the speed limit or the calculated required acceleration, when the calculated target speed has no positive value or has a value greater than or equal to the speed limit.

According to an embodiment, the required acceleration calculating device may calculate a required acceleration, based on at least one of a lower limit of the target speed or the present speed of the vehicle, and the controller may control the vehicle, based on at least one of the lower limit of the target speed or the calculated required acceleration, when the calculated target speed has a positive value less than the lower limit of the target speed.

According to an embodiment, the required acceleration calculating device may calculate, as the required acceleration, a value, which is obtained by multiplying an acceleration tuning parameter to a value obtained by subtracting the present speed of the host vehicle from the calculated target speed.

According to another aspect of the present disclosure, a method for controlling a speed of a vehicle may include receiving, by a communication device, at least one of a starting point of a speed trap, an end point of the speed trap, a speed limit in the speed trap, an average speed of the vehicle, a traveling distance from the starting point of the speed trap of the vehicle, or a present speed of the vehicle, setting, by a target speed setting device, a target point based on the end point of the speed trap, setting, by the target speed setting device, a starting point for maintaining a target speed, based on the set target point, determining, by the target speed setting device, whether the vehicle passes through the starting point for maintaining the target speed, and calculating, by the target speed setting device, the target speed, based on at least one of the starting point of the speed trap, the speed limit, the average speed, the traveling distance from the starting point of the speed trap, or the set target point, when the vehicle is not determined as passing through the starting point for maintaining the target speed, calculating, by a required acceleration calculating device, the required acceleration, based on the calculated target speed, the speed limit, the lower limit of the target speed, or the present speed of the vehicle, and controlling, by the controller, the vehicle, based on at least one of the calculated target speed or the calculated required acceleration.

According to an embodiment, the setting of the target point may include setting, by the target speed setting device, one of a point spaced apart toward the starting point of the speed trap from the end point of the speed trap by a margin distance or the end point of the speed trap, as the target point.

According to an embodiment, the setting of the starting point for maintaining the target speed may include setting, by the target speed setting device, one of a point spaced apart toward the starting point of the speed trap from the target point by the first distance, or the target point, as the starting point for maintaining the target speed.

According to an embodiment, the method may further include calculating by the required acceleration calculating device, a required acceleration, based on at least one of the speed limit or the present speed of the vehicle, and controlling, by the controller, the vehicle based on at least one of the speed limit or the calculated required acceleration when the target point may not be set, based on the end point of the speed trap.

According to an embodiment, the method may further include calculating, by the required acceleration calculating device, a required acceleration, based on at least one of a target speed calculated before the vehicle passes through the starting point for maintaining the target speed or the present speed of the vehicle, and controlling, by a controller, the vehicle, based on at least one of the target speed or a required acceleration, calculated before the vehicle passes through the starting point for maintaining the target speed, when the vehicle is determined as passing through the starting point for maintaining the target speed.

According to an embodiment, the determining of whether the vehicle passes through the starting point for maintaining the target speed may include determining, by the target speed setting device, the vehicle as passing through the starting point for maintaining the target speed, when a value, which is obtained by subtracting the traveling distance extending from the starting point of the speed trap, from a whole distance of the speed trap, is equal to or less than the distance extending from the starting point for maintaining the target speed to the end point of the speed trap.

According to an embodiment, the calculating of the target speed may include calculating, by the target speed setting device, the target speed based on at least one of i) a value obtained by dividing a target distance including a distance from the starting point of the speed trap to the set target point, by a speed limit, ii) a value obtained by dividing the traveling distance from the starting point of the speed trap by the average speed, or iii) a remaining distance including a distance from the present position of the host vehicle to the set target point.

According to an embodiment, the method may include calculating, by the required acceleration calculating device, a required acceleration, based on at least one of the speed limit or the present speed of the vehicle, and controlling, by the controller, the vehicle, based on at least one of the speed limit or the calculated required acceleration, when the calculated target speed has no positive value or has a value greater than or equal to the speed limit.

According to an embodiment, the method may further include calculating, by the required acceleration calculating device, a required acceleration, based on at least one of a lower limit of the target speed or the present speed of the vehicle, and controlling, by the controller, the vehicle, based on at least one of the lower limit of the target speed or the calculated required acceleration, when the calculated target speed has a positive value less than the lower limit of the target speed.

According to an embodiment, the calculating of the required acceleration may include calculating by the required acceleration calculating device, a value, which is obtained by multiplying a value obtained by subtracting the present speed of the host vehicle from the calculated target speed by an acceleration tuning parameter, as the required acceleration.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
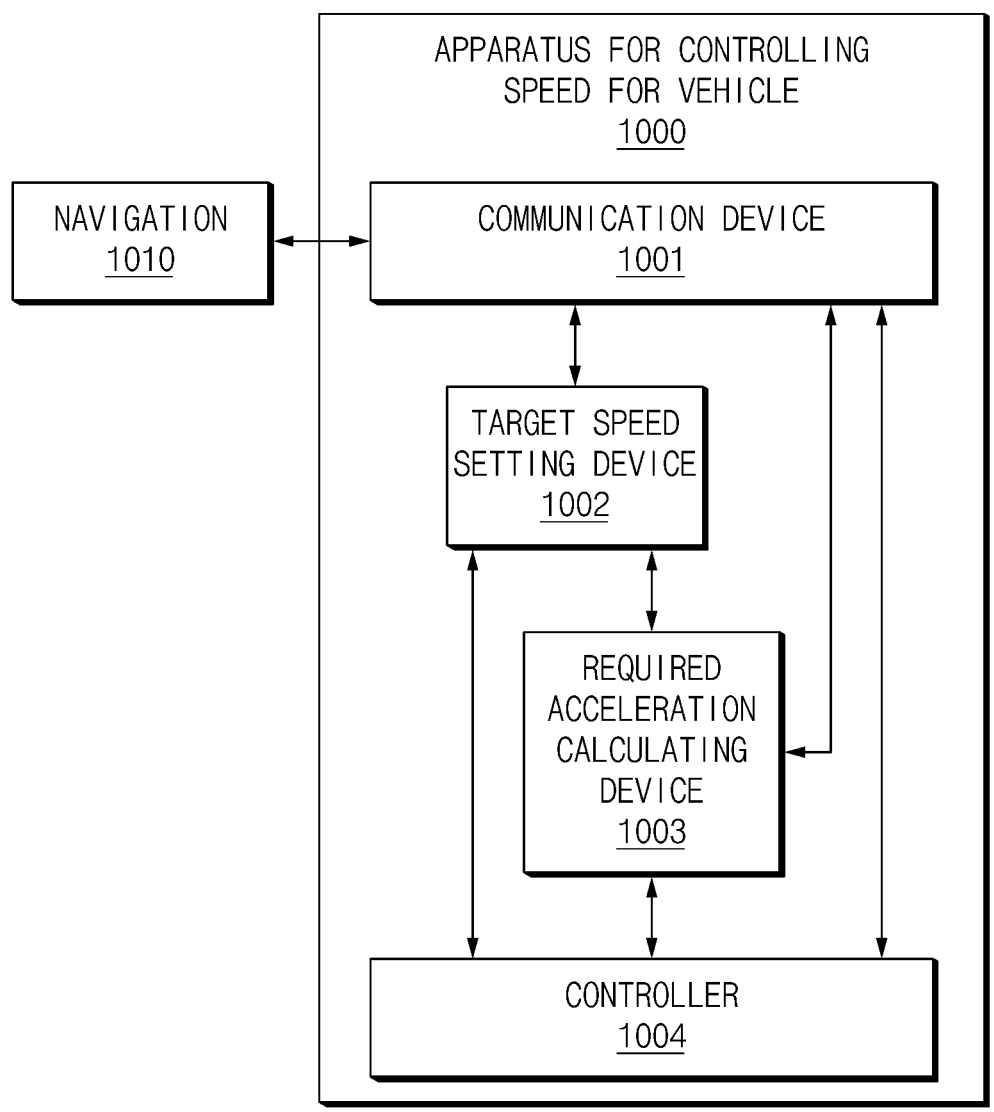
FIG. 1 is a view illustrating an apparatus for controlling a speed of a vehicle, according to an embodiment of the present disclosure.

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, a detailed description of well-known features or functions will be ruled out in order not to unnecessarily obscure the gist of the present disclosure.

In describing the components of the embodiment according to the present disclosure, terms such as first, second, "A", "B", "(a)", "(b)", and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to FIGS. 1 to 5.

FIG. 1 is a view illustrating an apparatus 1000 for controlling a speed of a vehicle, according to an embodiment of the present disclosure.

According to an embodiment of the present disclosure, the apparatus 1000 for controlling the speed of the vehicle may include a communication device 1001, a target speed setting device 1002, a required acceleration calculating device 1003, and a controller 1004.

In addition, according to embodiment of the present disclosure, the apparatus moo for controlling the speed of the vehicle may include at least one element which is not illustrated in the drawing.

According to an embodiment of the present disclosure, the apparatus moo for controlling the speed of the vehicle may be provided in the vehicle (hereinafter, the vehicle including the apparatus moo for controlling the speed of the vehicle is referred to as a "host vehicle").

In addition, according to embodiments, the host vehicle may include at least one of an electric vehicle (EV), a hybrid electric vehicle (HEV), a fuel cell electric vehicle, a plug-in hybrid electric vehicle (PHEV), or an internal combustion engine vehicle, but the present disclosure is not limited thereto.

According to an embodiment, the apparatus moo for controlling the speed of the vehicle may include the communication device 1001.

In this case, the communication device 1001 may employ a communication scheme, such as Local interconnection network (LIN), Controlled Area Network (CAN), FlexRay® Communication Bus, Media Oriented Systems Transport (MOST), Dedicated Short Range Communication (DSRC), Cellular Vehicle-to-Everything (C-V2X), Wi-Fi, Wireless Broadband (WiBro), or Worldwide Interoperability for Microwave Access (WiMax®), but the present disclosure is not limited thereto.

The communication device 1001 may make communication with the navigation 1010 to receive or transmit information.

In this case, the navigation 1010 may be provided in the host vehicle or may be provided in a portable device to make communication with the host vehicle or the apparatus moo for controlling the speed of the vehicle.

The communication device 1001 may receive at least one of a starting point of a speed trap, an end point of the speed trap, a speed limit in the speed trap, an average speed of the host vehicle, a traveling distance of the host vehicle from the starting point of the speed trap, or a present speed of the host vehicle.

In this case, the starting point of the speed trap may be a point at which the speed trap allowing the average speed of the vehicle to be equal to or less than the speed limit starts, and the end point of the speed trap may be a point at which the speed trap is terminated.

Alternatively, the speed limit of the speed trap, which is a speed that should be followed by the host vehicle, may include a reference compared with the average speed of the host vehicle.

In addition, the average speed of the host vehicle may include an average speed of the host vehicle from the starting point of the speed trap.

The communication device 1001 may make communication with at least one of the target speed setting device 1002, the required acceleration calculation device 1003, or the controller 1004.

The communication device 1001 may transmit, to the target speed setting device 1002, at least one of a starting point of a speed trap, an end point of the speed trap, a speed limit in the speed trap, an average speed of the host vehicle, a traveling distance of the host vehicle from the starting point of the speed trap, or a present speed of the host vehicle.

In addition, the communication device 1001 may transmit the present speed of the host vehicle to the required acceleration calculating device 1003.

The apparatus 1000 for controlling the speed of the vehicle may include the target speed setting device 1002.

The target speed setting device 1002 may receive, from the communication device 1001, at least one of the starting point of the speed trap, the end point of the speed trap, the speed limit in the speed trap, the average speed of the host vehicle, the traveling distance of the host vehicle from the starting point of the speed trap, or the present speed of the host vehicle.

The target speed setting device 1002 may set a target point based on the end point of the speed trap.

In this case, the target point may be a point spaced apart toward the starting point of the speed trap from the end point of the speed trap by a margin distance. When the target point is not set, the end point of the speed trap may be the target point.

In addition, the target point may include a point at which the average speed of the host vehicle is equal to or less than the speed limit when the host vehicle arrives at the target point, when the apparatus moo for controlling the speed of the vehicle controls the speed of the host vehicle.

The technical feature of setting the target point based on the end point of the speed trap, by the target speed setting device 1002 will be described in detail with reference to FIG. 2.

In addition, the target speed setting device 1002 may set a starting point for maintaining a target speed, based on the set target point.

In this case, the starting point for maintaining the target speed may be a point spaced apart toward the starting point of the speed trap from the target point by a first distance, or may be the target point.

In addition, the starting point for maintaining the target speed may include a point at which the host vehicle starts maintaining the speed of the host vehicle, when the host vehicle arrives at the starting point for maintaining the target speed.

The technical feature of setting the starting point for maintaining the target speed based on the target point, by the target speed setting device 1002 will be described in detail with reference to FIG. 2.

The target speed setting device 1002 may calculate a target speed based on at least one of the starting point of the speed trap, the speed limit, the average speed, the traveling distance from the starting point of the speed trap, or the set target point, when the host vehicle is not determined as passing through the starting point for maintaining the target speed.

In this case, the target speed may include an average value of a speed at which the host vehicle should travel from the present position of the vehicle to the target point, such that the average speed of the host vehicle is equal to or less than the speed limit, when the host vehicle arrives at the target point.

In addition, the target speed may be consecutively calculated and varied, as the host vehicle travels.

The technical feature of calculating the target speed by the target speed setting device 1002 will be described in detail with reference to FIGS. 2 and 3.

The target speed setting device 1002 may consecutively calculate the target speed before the host vehicle passes through the starting point for maintaining the target speed, because the target speed is calculated, when the host vehicle is not determined as passing through the starting point for maintaining the target speed.

The target speed setting device 1002 may transmit at least one of the target point, the start point for maintaining the target speed, or the target speed to at least one of the communication device 1001, the required acceleration calculating device 1003, or the controller 1004.

The apparatus 1000 for controlling the speed of the vehicle may include the required acceleration calculating device 1003.

The required acceleration calculating device 1003 may calculate a required acceleration, based on at least one of the calculated target speed or the present speed of the host vehicle.

The required acceleration may be an acceleration of the host vehicle, which is to be controlled such that the host vehicle travels at the target speed.

The details of calculating the required acceleration by the required acceleration calculating device 1003 will be described in detail with reference to FIG. 3.

The required acceleration calculating device 1003 may transmit the calculated required acceleration to at least one of the communication device 1001, the target speed setting device 1002, or the controller 1004.

The apparatus 1000 for controlling the speed of the vehicle may include the controller 1004.

The controller 1004 may control the host vehicle, based on at least one of the calculated target speed or the calculated required acceleration.

The controller 1004 may control the host vehicle to be matched with the required acceleration, by controlling at least one of an accelerator, a braking device, or a steering device of the host vehicle.

The details of controlling the host vehicle by the controller 1004 will be described in detail with reference to FIG. 3.

Figure 2:
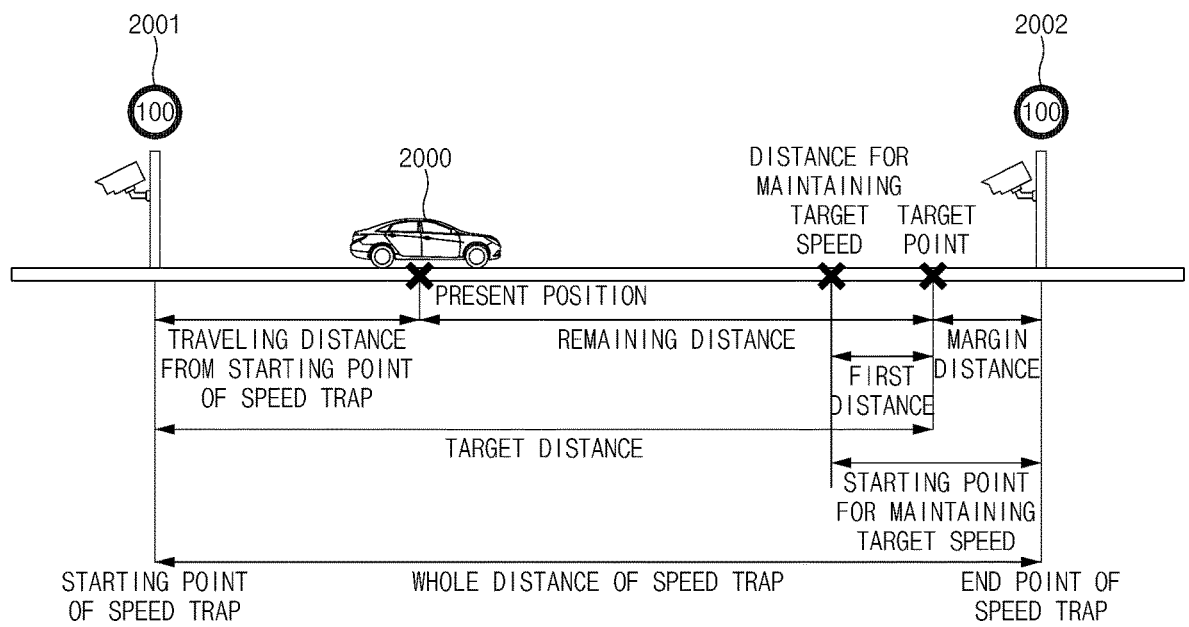
FIG. 2 is a view illustrating that a vehicle is controlled by an apparatus for controlling a speed of a vehicle or through a method for controlling the speed of the vehicle, according to another embodiment of the present disclosure.

FIG. 2 is a view illustrating that a vehicle is controlled by an apparatus (e.g., reference numeral 1000 of FIG. 1) for controlling the speed of the vehicle or through a method for controlling the speed of the vehicle, according to another embodiment of the present disclosure.

FIG. 2 is a view illustrating any point when a host vehicle 2000 travels toward an end point 2002 of a speed trap after passing through a starting point 2001 of the speed trap.

As illustrated in FIG. 2, the speed limit of the speed trap may be 100 km/h. Accordingly, the speed of the host vehicle at the starting point 2001 of the speed trap, the speed of the host vehicle at the end point 2002 of the speed trap, or the average speed of the host vehicle from the starting point 2001 of the speed trap to the end point 2002 of the speed trap should be 100 km/h or less.

In this drawing, the host vehicle 2000 may travel at a present position positioned at a distance spaced apart from the starting point 2001 of the speed trap, after passing through the starting point 2001 of the speed trap.

The target speed setting device (e.g., reference numeral 1002 of FIG. 1) may set, as the target point, any one of a point spaced toward the starting point 2001 of the speed trap from the end point 2002 of the speed trap by the margin distance, or the end point 2002 of the speed trap.

For example, the margin distance may be 500 m, but may be changed at any times, depending on the traveling distance of the host vehicle 2000 from the starting point 2001 of the speed trap, the average speed of the host vehicle 2000 from the starting point 2001 of the speed trap, the whole distance of the speed trap, the speed limit, the detailed traffic situation of the speed trap, or user settings.

In this drawing, the target point may be set to the point spaced toward the starting point 2001 of the speed trap from the end point 2002 of the speed trap by the margin distance.

When the host vehicle 2000 arrives at the target point, the average speed of the host vehicle 2000 from the starting point 2001 of the speed trap may be equal to or less than 100 km/h which is the speed limit of the speed trap.

When the average speed of the host vehicle 2000 is maintained to be equal to or greater than the speed limit and controlled to be equal to or less than the speed limit right before the end point 2002 of the speed trap, the user may feel the anxiety as the vehicle travels while exceeding the speed limit.

In addition, when the host vehicle 2000 is controlled to travel at the average speed equal to or less than the speed limit right before the end point 2002 of the speed trap, and when the deceleration of the host vehicle 2000 is not made due to the traffic situation of another vehicle at the end point of the speed trap, the host vehicle 2000 may pass through the end point 2002 of the speed trap at the average speed greater than the speed limit. Accordingly, the host vehicle 2000 may be a target of the traffic regulation.

According to embodiments, in the apparatus for controlling the speed of the vehicle and the method for the same, as the target point is set to a point spaced apart toward the starting point 2001 of the speed trap from the end point 2002 of the speed trap by the margin distance, even if the user drives the host vehicle 2000 to pass through the target point without arriving at the end point 2002 of the speed trap, the average speed of the host vehicle 2000 is controlled to be equal to or less than the speed limit. Accordingly, the user may be prevented from feeling disharmony, thereby ensuring the safety of the user.

However, when the target point or the margin distance is not set, or when the host vehicle 2000 has already traveled an excessively longer distance to approach the end point 2002 of the speed trap, the target speed setting device may set the end point 2002 of the speed trap as the target point.

In this case, the distance from the present position of the host vehicle 2000 to the target point may be the remaining distance.

In addition, the distance to the target point from the starting point 2001 of the speed trap may be a target distance.

In addition, the sum of the target distance and the margin distance may be the whole distance of the speed trap.

In addition, the target speed setting device may set, as a starting point for maintaining a target speed, a point spaced apart toward the starting point 2001 of the speed trap from the target point by the first distance.

For example, the first distance may be 1500 m, but may be changed at any times, depending on the traveling distance of the host vehicle 2000 from the starting point 2001 of the speed trap, the average speed of the host vehicle 2000 from the starting point 2001 of the speed trap, the whole distance of the speed trap, the speed limit, the detailed traffic situation of the speed trap, the margin distance, or user settings.

In this case, the distance from the starting point for maintaining the target speed to the end point 2002 of the speed trap may be the distance for maintaining the target speed.

According to the related art, when the average speed of the vehicle traveling the speed trap is greater than the speed limit, the average speed of the vehicle is controlled to be equal to or less than the speed limit, without considering the remaining distance.

As described above, according to the related art, even though the remaining distance is sufficiently longer, the speed of the vehicle is excessively decelerated such that the average speed of the vehicle is equal to or less than the speed limit, and then the vehicle is re-accelerated, thereby wasting the energy and allowing the user to feel disharmony.

According to embodiments, in the apparatus for controlling the speed of the vehicle or the method for the same, the starting point for maintaining the target speed is set to a point spaced apart toward the starting point 2001 of the speed trap from the target point by the first distance and the host vehicle 2000 is allowed to travel at a speed maintained to the target speed, the speed limit, or the lower limit of the target speed from a time point at which the host vehicle 2000 arrives at the starting point for maintaining the target speed. Accordingly, the host vehicle 2000 is controlled to travel at the speed limit or less, when the host vehicle 2000 arrives at the target point, thereby overcoming a problem in which energy is wasted, as the vehicle is controlled to travel at the average speed equal to or less than the speed limit and to be re-accelerated.

The target speed setting device may consecutively calculate the target speed until the host vehicle 2000 arrives at the starting point for maintaining the target speed after passing through the starting point 2001 of the speed trap.

In detail, the target speed setting device may calculate the target speed based on at least one of i) a value obtained by dividing the target distance including the distance from the starting point 2001 of the speed trap to the set target point, by a speed limit, ii) a value obtained by dividing the traveling distance from the starting point 2001 of the speed trap by the average speed, or iii) a remaining distance including the distance from the present position of the host vehicle 2000 to the set target point.

In more detail, the target speed setting device may calculate the target speed through following Equation 1.

$$\text{Target speed} = \frac{\text{remaining distance}}{\frac{\text{target distance}}{\text{speed limit}} - \frac{\text{traveling distance}}{\text{average speed}}} \qquad \text{Equation 1}$$

In this case, the remaining distance may be a distance from a present position of the host vehicle 2000 to the target point. The target distance may be a distance from the starting point 2001 of the speed trap to the target point. The speed limit may be a speed limit in the speed trap in which the host vehicle 2000 is being traveled. The traveling distance may be a distance in which the host vehicle 2000 travels from the starting point 2001 of the speed trap. The average speed may be an average speed at which the host vehicle 2000 is traveling from the starting point 2001 of the speed trap to the present position.

The target speed setting device may consecutively calculate and update the target speed until the host vehicle 2000 arrives at the starting point for maintaining the target speed.

According to embodiments, in the apparatus for controlling the speed of the vehicle or the method for the same, the host vehicle 2000 may consecutively calculate the target speed before the host vehicle 2000 arrives at the starting point for maintaining the target speed, thereby accurately controlling the average speed of the vehicle.

In addition, when the host vehicle 2000 is determined as passing through the starting point for maintaining the target speed, the required acceleration calculating device 1003 may calculate a required acceleration, based on the target speed calculated before the host vehicle 2000 passes through the starting point for maintaining the target speed, and may control the host vehicle 2000.

In detail, when the host vehicle 2000 is determined as passing through the starting point for maintaining the target speed, the required acceleration calculating device may calculate the required acceleration, based on at least one of the target speed calculated before the host vehicle 2000 passes through the starting point for maintaining the target speed, or the present speed of the vehicle.

In addition, the controller may control the vehicle, based on at least one of the target speed calculated before the host vehicle 2000 passes through the starting point for maintaining the target speed or the calculated required acceleration.

As described above, according to embodiments, in the apparatus for controlling the speed of the vehicle and the method for the same, when the host vehicle 2000 passes through the starting point for maintaining the target speed, the host vehicle 2000 may be controlled to arrive at the target point while maintaining the target speed such that the average speed of the host vehicle 2000 is equal to or less than the speed limit.

In other words, according to embodiments, in the apparatus for controlling the speed of the vehicle and the method for the same, when the host vehicle 2000 is determined as passing through the starting point for maintaining the target speed, the host vehicle 2000 may stop consecutively calculating the target speed, and may control the vehicle, based on the target speed calculated before the host vehicle 2000 passes through the starting point for maintaining the target speed.

Meanwhile, the required acceleration calculating device may calculate the required acceleration based on the speed limit, when the target point may not be set based on the end point 2002 of the speed trap.

For example, the required acceleration calculating device may calculate the required acceleration, based on at least one of the speed limit or the present speed of the host vehicle 2000, because the calculation of the target speed through Equation 1 is failed, when information on the end 2002 point of the speed trap is not accurately input or when the target point is not set.

In addition, the controller may control the host vehicle 2000, based on at least one of the speed limit or the calculated required acceleration.

Figure 3:
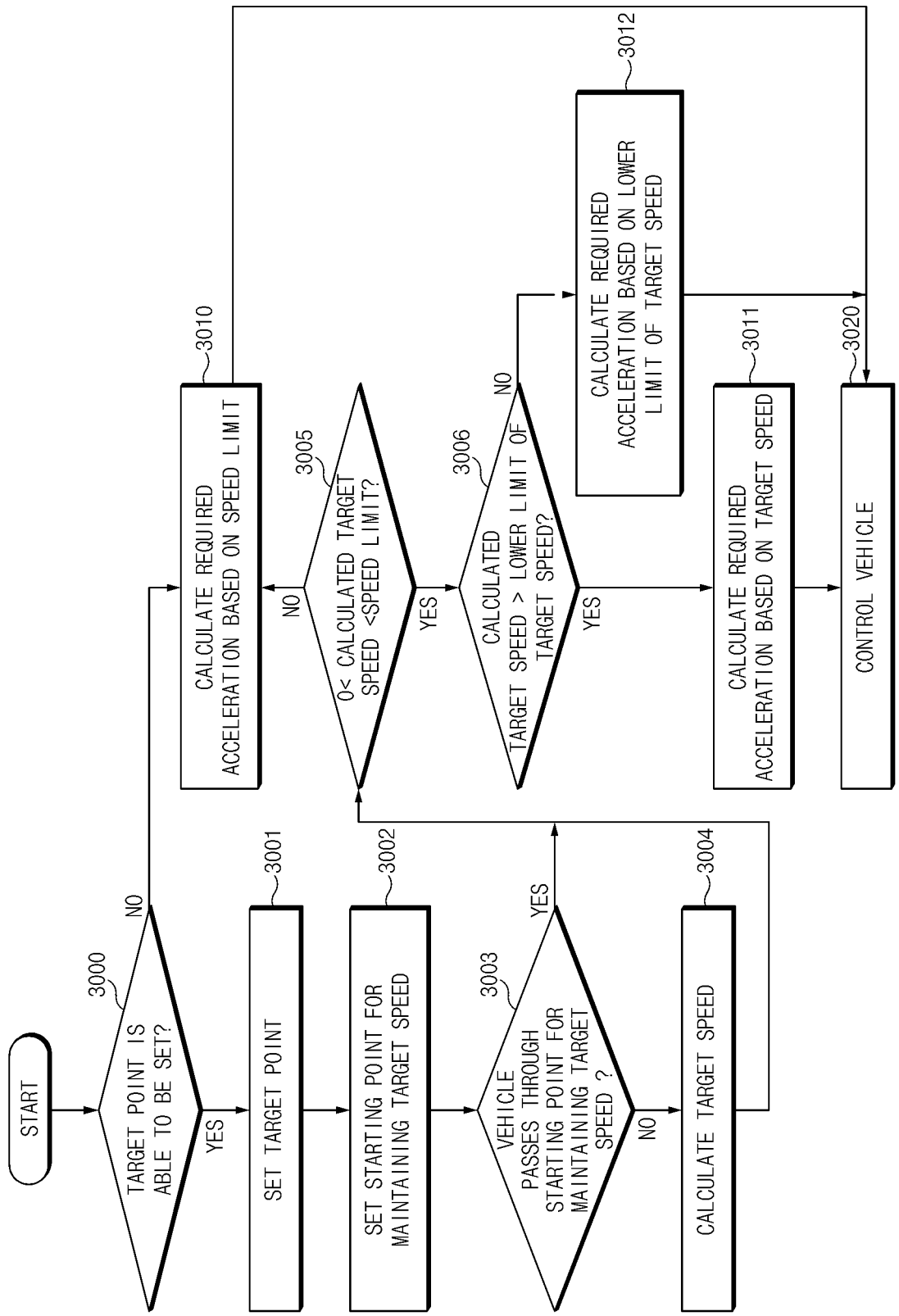
FIG. 3 is a flowchart of controlling a vehicle by an apparatus for controlling the speed of the vehicle or through a method for controlling the speed of the vehicle, according to another embodiment of the present disclosure.

FIG. 3 is a flowchart of controlling a vehicle according to an apparatus for controlling the speed of the vehicle or a method for the same, according to another embodiment of the present disclosure.

The target speed setting device (e.g., reference numeral 1002 of FIG. 1) may determine whether to the target point is able to be set, based on the end point of the speed trap (3000).

The required acceleration calculating device (e.g., reference numeral 1003 of FIG. 1) may calculate the required acceleration based on the speed limit (3010), when the target point is not set based on the end point of the speed trap ("NO" of "3000").

In detail, the required acceleration calculating device may calculate the required acceleration based on at least one of the speed limit (3010) or the present speed of the host vehicle, when the target point is not set based on the end point of the speed trap ("NO" of "3000").

In addition, the controller (see reference numeral 1004 of FIG. 1) may control the host vehicle, based on the speed limit or the calculated required acceleration (3020), when the target point is not set based on the end point of the speed trap ("NO" of "3000").

In detail, the calculated required acceleration may be a required acceleration calculated, based on at least one of the speed limit or the present speed of the host vehicle (3010), when the target point is not set based on the end point of the speed trap ("NO" of "3000").

In addition, the target speed setting device may set, as the target point, the point spaced apart toward the starting point of the speed trap from the end point of the speed trap by a margin distance, or the end point of the speed trap (3001), when the target point is set based on the end point of the speed trap ("YES" of "3000")

In addition, the target speed setting device may set the starting point for maintaining the target speed, based on the target point (3002).

In detail, the target speed setting device may set, as the starting point for maintaining a target speed, the point spaced apart toward the starting point of the speed trap from the target point by the first distance or the target point (3002).

Further, the target speed setting device may determine whether the host vehicle passes through the starting point for maintaining the target speed (3003).

In detail, the target speed setting device may determine the host vehicle as passing through the starting point for maintaining the target speed, when a value, which is obtained by subtracting the traveling distance extending from the starting point of the speed trap, from the whole distance of the speed trap, is equal to or less than the distance extending from the starting point for maintaining the target speed to the end point of the speed trap ("YES" of 3003)

The target speed setting device may make a determination for the target speed calculated before the host vehicle passes through the starting point for maintaining the target speed, instead of calculating the target speed (3005 and 3006), when the host vehicle is determined as passing through the starting point for maintaining the target speed ("YES" of "3003").

This is because the target speed setting device does not need to calculate a new target speed, when the host vehicle passes through the starting point for maintaining the target speed ("YES" of "3003").

Meanwhile, the target speed setting device may calculate the target speed (3004) when the host vehicle is not determined as passing through the starting point for maintaining the target speed ("NO" of "3003").

In detail, the target speed setting device may calculate the target speed based on at least one of i) a value obtained by dividing a target distance including the distance from the starting point 2001 of the speed trap to the set target point, by a speed limit, ii) a value obtained by dividing the traveling distance from the starting point 2001 of the speed trap by the average speed, or iii) a remaining distance including the distance from the present position of the host vehicle 2000 to the set target point (3004).

In more detail, the target speed setting device may calculate the target speed through following Equation 1 as described with reference to FIG. 2 (3004).

In addition, the target speed setting device may determine whether the calculated target speed has a positive value less than the value of the speed limit (3005).

The required acceleration calculating device may calculate the required acceleration based on the speed limit (3010), when the calculated target speed has no positive value, or has a value equal to or greater than that of the speed limit ("NO" of "3005").

In detail, the required acceleration calculating device may calculate the required acceleration based on at least of the speed limit or the present speed of the host vehicle (3010), when the calculated target speed has no positive value, or has a value equal to or greater than that of the speed limit ("NO" of "3005").

In addition, the controller may control the host vehicle, based on at least one of the speed limit or the calculated required acceleration (3020), when the calculated target speed has no positive value, or has the value equal to or greater than that of the speed limit ("NO" of "3005").

In this case, the calculated required acceleration may be a required acceleration calculated based on at least of the speed limit or the present speed of the host vehicle (3010), when the calculated target speed has no positive value, or has a value equal to or greater than that of the speed limit ("NO" of "3005").

For example, the average speed of the host vehicle till the target point may be less than the speed limit, even if the speed of the host vehicle is sufficiently increased, when the average speed of the host vehicle till the present position is equal to or less than a specific level.

However, the speed of the host vehicle may be controlled to be excessively higher because the average speed of the host vehicle till the present position is sufficiently lower, which may threaten the safety of the user and the safety of another vehicle.

Accordingly, the required acceleration calculating device may calculate the required acceleration based on the speed limit (3010), when the calculated target speed has no positive value, or has a value equal to or greater than that of the speed limit ("NO" of "3005"), thereby ensuring the safety of the user and the safety of the user of the other vehicle.

Meanwhile, the required acceleration calculating device may determine whether the calculated target speed has a value greater than the lower limit of the target speed (3006), when the calculated target speed has the positive value less than that of the speed limit ("YES" of "3005").

The required acceleration calculating device may calculate the required acceleration, based on the lower limit of the target speed (3012), when the calculated target speed has a positive value equal to or less than the lower limit of the target speed ("NO" of "3006"), thereby ensuring the safety of the user and the safety of the user of the other vehicle.

For example, the average speed of the host vehicle till the present position may significantly exceed the speed limit. In this case, when the host vehicle travels till the target point at a speed sufficiently less than the speed limit, the average speed of the host vehicle may be equal to or less than the speed limit when the host vehicle arrives at the target point.

However, when the host vehicle is rapidly decelerated or travels the road at a speed significantly less than the speed limit because the average speed of the host vehicle is sufficiently less than the speed limit, the host vehicle may disturb the traffic of another vehicle or may threaten the safety of the user in the host vehicle or the safety of the user in another vehicle.

Accordingly, the required acceleration calculating device calculates the required acceleration, based on the lower limit of the target speed (3012), when the calculated target speed has the positive value equal to or less than the lower limit of the target speed ("NO" of "3006"), thereby making a traffic situation smooth, and ensuring the safety of the user in the host vehicle and the safety of the user in the other vehicle.

In addition, the lower limit of the target speed may be a value obtained by multiplying the speed limit by the value ranging from '0' to '1'.

For example, the lower limit of the target speed may be a value obtained by multiplying the speed limit by '0.5'.

Meanwhile, although the lower limit of the target speed may be equal to the lowest speed limit pursuant to a road traffic Act for a relevant speed trap, the lower limit of the target speed may be greater than the lowest speed limit pursuant to the road traffic Act depending on the detailed situation of the relevant speed trap.

Meanwhile, with reference to the accompanying drawings, the required acceleration calculating device determines whether the calculated target speed has a value greater than the lower limit of the target speed (3006) after the calculated target speed has the positive value less than the value of the speed limit. This is provided only for the illustrative purpose, and the sequence of the determinations (3005 and 3006) may differ from the sequences of the drawing. The determinations (3005 and 3006) may be performed simultaneously in parallel.

The required acceleration may be calculated, based on the calculated target speed by the target speed setting device (3011), when the calculated target speed is less than the speed limit, and a value greater than the lower limit of the target speed ("YES" of "3005" and "YECS" of "3006").

In detail, the required acceleration calculating device may calculate, as the required acceleration, a value obtained by multiplying a value, which is obtained by subtracting the present speed of the host vehicle from the calculated target speed, by an acceleration tuning parameter (3011), when the target speed calculated by the target speed setting device is less than the speed limit, and greater than the lower limit of the target speed ("YES" of "3005" and "YES" of 3006).

In more detail, the required acceleration calculating device may calculate the required acceleration through the following Equation 2 (3011).

$$\text{Required acceleration} = (\text{target speed} - \text{present speed}) \times k \quad \text{Equation 2}$$

In this case, the "target speed" may denote a value obtained through the calculation of the target speed setting device (3004), the "present speed" may denote the present speed of the host vehicle at a time point at which the required acceleration is calculated, and the "k" may denote an acceleration tuning parameter.

Meanwhile, if necessary, the required acceleration may be calculated by substituting the speed limit (3010) or the lower limit of the target speed (3012) for the target speed.

In detail, i) the required acceleration may be calculated by substituting the speed limit for the target speed through Equation 2 (3010), when the target point is not set ("NO" of "3000") or when the calculated target speed has no positive value or has a value greater than or equal to the speed limit ("NO" of "3005"), and ii) the required acceleration may be calculated by substituting the lower limit of the target speed for the target speed through Equation 2 (3012), when the calculated target speed has a positive value less than the lower limit of the target speed ("NO" of "3006").

As described above, the required acceleration calculating device may calculate the required acceleration, based on at least one of the calculated target speed, the speed limit, the lower limit of the target speed, or the present speed of the host vehicle (3010, 3011, or 3012).

The controller may control the host vehicle, based on at least one of the calculated target speed or the calculated required acceleration (3020).

For example, the controller may compare the target speed and the required acceleration with the target speed and the required acceleration calculated by an inter-device distance controller provided in the host vehicle, and transmit the comparison result to at least one of the acceleration device, the braking device, or the steering device of the vehicle (3020).

In addition, the target speed setting device may determine whether to set the target point (3000), and may repeat the above procedure (3001 and other steps) thereafter.

FIGS. 4A, 4B, 4C, and 4D are views illustrating the average speed or the present speed of the vehicle for the position of the vehicle, according to the related art or several embodiments of the present disclosure.

FIGS. 4A, 4B, 4C, and 4D are graphs illustrating the present speed or the average speed of the host vehicle, as the function of the position of the host vehicle, when the average speed of the host vehicle, which travels at the speed of 120 km/h, is controlled to the speed limit or less in the speed trap applied with the speed limit of 100 km/h, and having the whole length of 5 km, according to the related art or the embodiments of the present disclosure.

Each of FIG. 4A, 4B, 4C, or 4D illustrates four cases illustrating that the host vehicle starts reducing the average speed of the host vehicle to be a speed limit or less at different positions.

Figure 4A:
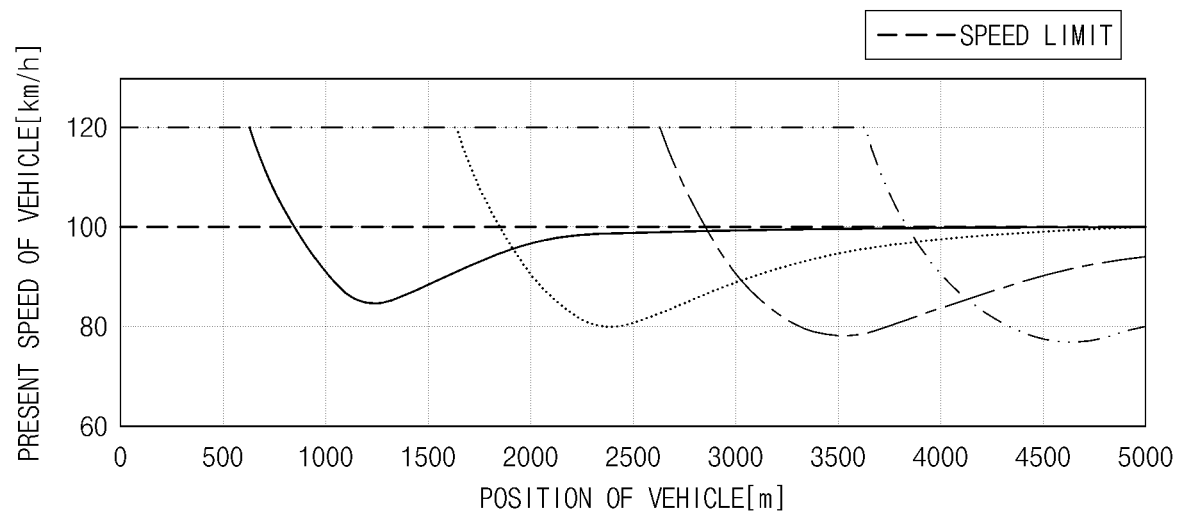
FIGS. 4A, 4B, 4C, and 4D are views illustrating an average speed or a present speed of a vehicle for a position of the vehicle, according to the related art or several embodiments of the present disclosure.
Figure 4B:
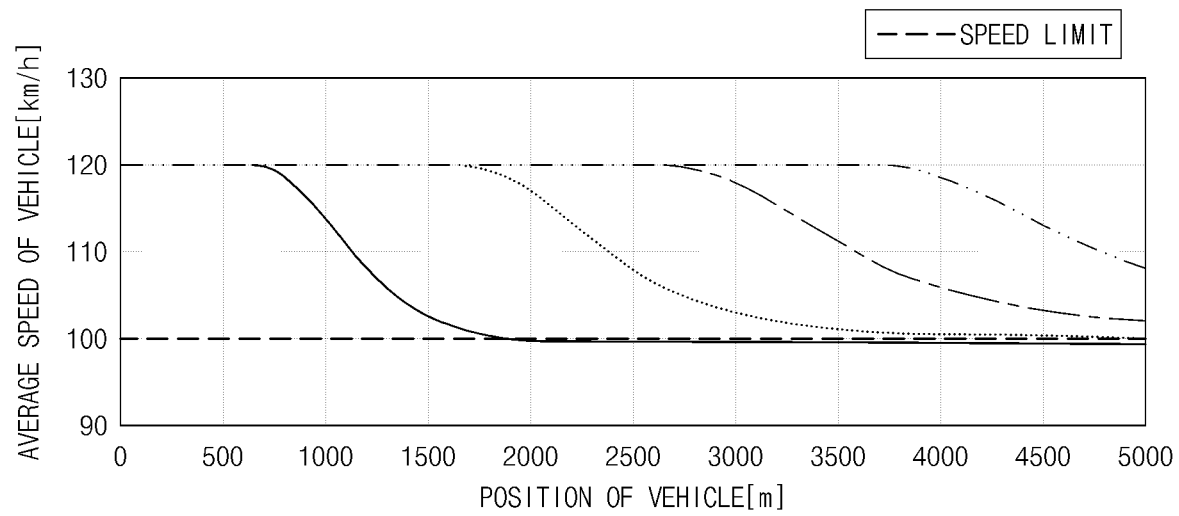

FIGS. 4A and 4B may be graphs illustrating four cases that the host vehicle controls the average speed to be the speed limit or less, after the host vehicle travels at the speed of 120 km/h, in the speed trap applied with the speed limit is 100 km/h, according to the related art.

FIG. 4A may be a graph illustrating the present speed of the host vehicle, when the average speed of the host vehicle is controlled to be the speed limit of 100 km/h or less, after the host vehicle travels at the speed of 120 km/h, according to the related art.

In all four cases illustrated in FIG. 4A, the host vehicle rapidly reduces the present speed to reduce the average speed thereof, without considering the remaining distance, but accelerates again, because the average speed of the host vehicle becomes less than the speed limit.

As described above, according to the related art of accelerating the host vehicle again after rapidly reducing the speed of the host vehicle, the energy is inefficiently used due to the re-acceleration.

FIG. 4B may a graph illustrating the average speed of the host vehicle, when the average speed of the host vehicle is controlled to the speed limit of 100 km/h or less, after the host vehicle travels 120 km/h according to the related art.

Figure 4C:
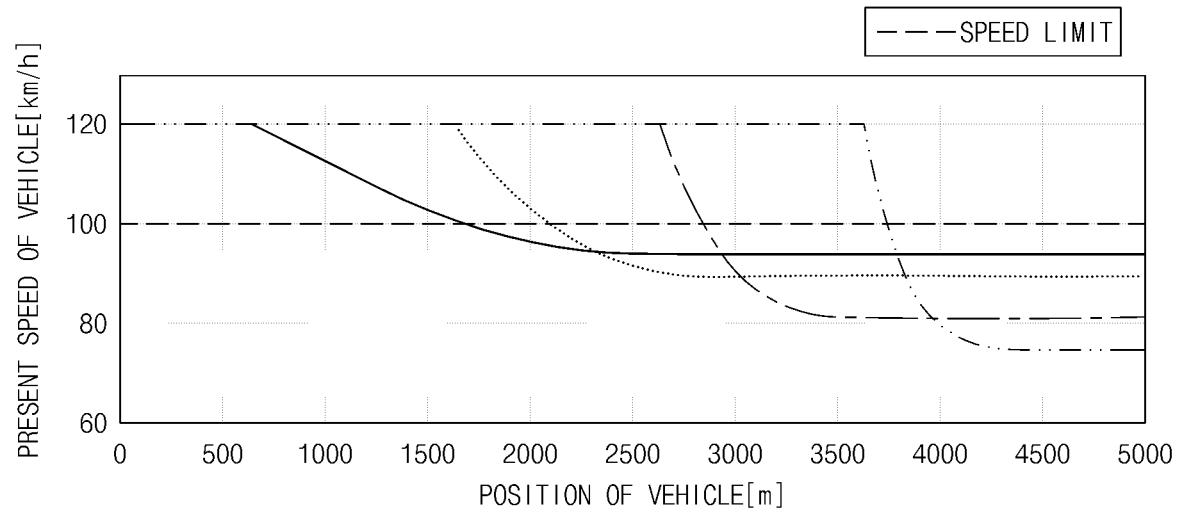

FIG. 4C may a graph illustrating the present speed of the host vehicle, when the average speed of the host vehicle is controlled to the speed limit of 100 km/h or less, after the host vehicle travels at the speed of 120 km/h in the apparatus for controlling the speed of the vehicle and the method for the same, according to embodiments of the present disclosure.

As illustrated in FIG. 4C, in the apparatus for controlling the speed of the vehicle and the method for the same, according to embodiments of the present disclosure, the target speed is consecutively calculated till the starting point for maintaining the target speed such that the host vehicle is controlled, and not newly calculated after the starting point for maintaining the target speed. Accordingly, the present speed of the host vehicle may be constantly maintained after any point.

As described above, in the apparatus for controlling the speed of the vehicle and the method for the same according to embodiments of the present disclosure, energy may be prevented from being inefficiently consumed due to re-acceleration after the speed of the host vehicle is rapidly reduced, which differs from the related art.

Figure 4D:
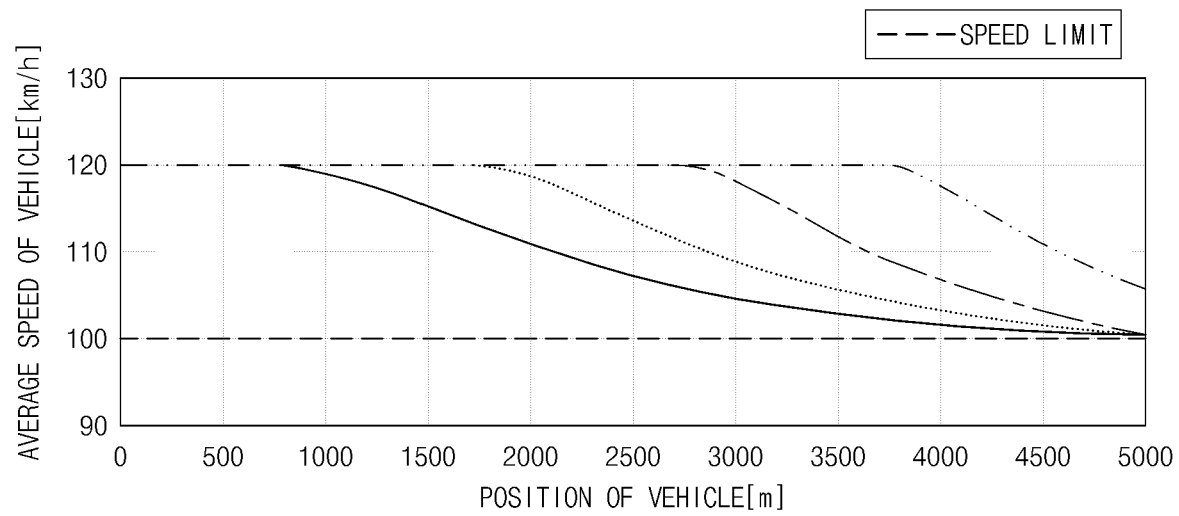

FIG. 4D may a graph illustrating the average speed of the host vehicle, when the average speed of the host vehicle is controlled to the speed limit of 100 km/h or less, after the host vehicle travels at the speed of 120 km/h in the apparatus for controlling the speed of the vehicle and the method for the same, according to embodiments of the present disclosure.

Figure 5:
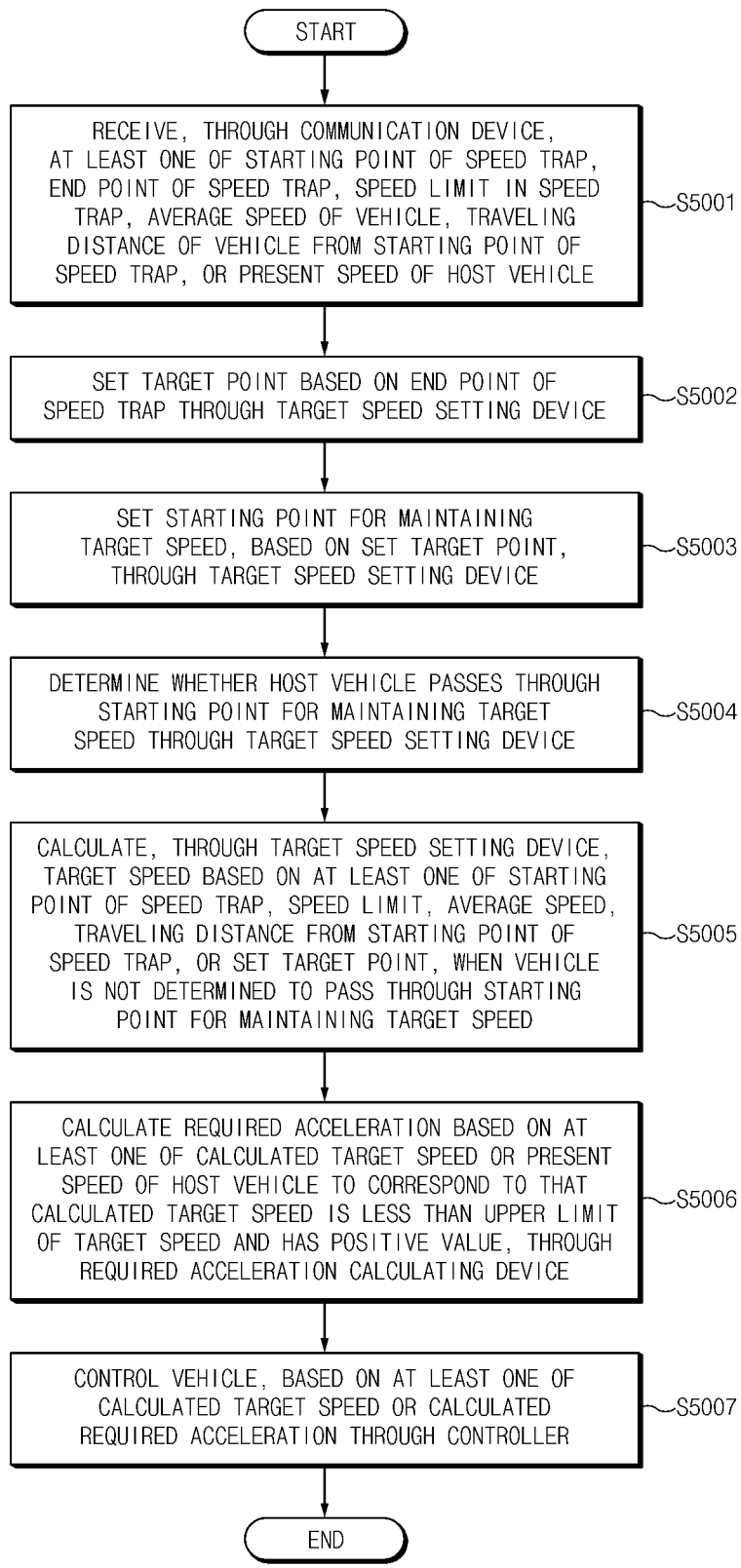
FIG. 5 is a view illustrating a method for controlling a speed of a vehicle, according to another embodiment of the present disclosure.

FIG. 5 is a view illustrating a method for controlling a speed of a vehicle, according to another embodiment of the present disclosure.

The apparatus (e.g., reference numeral moo of FIG. 1) for controlling the speed of the vehicle described with reference to FIGS. 1 to 4D may perform the method to be described with reference to FIG. 5.

According to an embodiment of the present disclosure, the method for controlling the speed of the vehicle may include: receiving, through a communication device (e.g., reference numeral 1001 of FIG. 1), at least one of a starting point of a speed trap, an end point of the speed trap, a speed limit in the speed trap, an average speed of a host vehicle, a traveling distance of the host vehicle from the starting point of the speed trap, or a present speed of the host vehicle (S5001), setting the target point based on the end point of the speed trap through the target speed setting device (e.g., reference numeral 1002 of FIG. 1) (S5002), setting the starting point for maintaining the target speed, based on the set target point, through the target speed setting device (S5003), determining whether the host vehicle passes through the starting point for maintaining the target speed through the target speed setting device (S5004), calculating, through the target speed setting device, a target speed based on the at least one of the starting point of the speed trap, the speed limit in the speed trap, the average speed of the host vehicle, the traveling distance from the starting point of the speed trap, or the present speed of the host vehicle, when the host vehicle is not determined to pass through the starting point for maintaining the target speed (S5005), calculating a required acceleration based on at least one of the calculated target speed or the present speed of the host vehicle, through the required acceleration calculating device (e.g., reference numeral 1003 of FIG. 1) (S5006), and controlling a vehicle, based on at least one of the calculated target speed or the calculated required acceleration through the controller (e.g., reference numeral 1004 of FIG. 1) (S5007).

In this case, "S5001" may be performed through the communication device described with reference to FIGS. 1 to 4D.

"S5002", "S5003", "S5004", and "S5005" may be performed through the target speed setting device described with reference to FIGS. 1 to 4D.

"S5002" may include setting, as the target point, any one of a point spaced apart toward the starting point of the speed trap from the end point of the speed trap by a margin distance, or the end point of the speed trap, through the target speed setting device.

Meanwhile, according to an embodiment, the method for controlling the speed of the vehicle may further include calculating the required acceleration, based on at least one of the speed limit or the present speed of the host vehicle, through the required acceleration calculating device, and controlling the host vehicle, based on at least one of the speed limit or the calculated required acceleration through the controller, when the setting of the target point based on the end point of the speed trap is failed.

"S5003" may include setting, as the starting point for maintaining a target speed, the point spaced apart toward the starting point of the speed trap from the target point by the first distance, through the target speed setting device.

"S5004" may include determining the host vehicle as passing through the starting point for maintaining the target speed through the target speed setting device, when a value, which is obtained by subtracting the traveling distance extending from the starting point of the speed trap, from the whole distance of the speed trap, is equal to or less than the distance extending from the starting point for maintaining the target speed to the end point of the speed trap.

Meanwhile, according to an embodiment, the method for controlling the speed of the vehicle may further include calculating, through the required acceleration calculating device, a required acceleration, based on at least one the target speed, which is calculated before the host vehicle passes through the starting point for maintaining the target speed, or the present speed of the host vehicle, and controlling, through the controller, the host vehicle, based on at least one the target speed or the required acceleration calculated before the host vehicle passes through the starting point for maintaining the target speed, when the host vehicle is determined as passing through the starting point for maintaining the target speed.

"S5005" may include calculating, through the target speed setting device, the target speed based on at least one of i) a value obtained by dividing a target distance including the distance from the starting point of the speed trap to the set target point, by a speed limit, ii) a value obtained by dividing the traveling distance from the starting point of the speed trap by the average speed, or iii) a remaining distance including a distance from the present position of the host vehicle to the set target point.

Meanwhile, the method for controlling the speed of the vehicle according to an embodiment may further include calculating, through the required acceleration calculating device, a required acceleration based on at least of the speed limit or the present speed of the host vehicle, and controlling, through the controller, the host vehicle, based on at least one of the speed limit or the required acceleration calculated, when the calculated target speed has no positive value, or has a value equal to or greater than that of the speed limit.

In addition, the method for controlling the speed of the vehicle according to an embodiment may further include calculating, through the required acceleration calculating device, a required acceleration based on at least of the lower limit of the target speed or the present speed of the host vehicle, when the calculated target speed has a positive value less than the lower limit of the target speed, and controlling, through the controller, the host vehicle, based on at least one of the lower limit of the target speed or the required acceleration calculated.

In this case, "S5006" may be performed through the required acceleration calculating device described with reference to FIGS. 1 to 4D.

"S5006" may include calculating, as the required acceleration, a value, which is obtained by multiplying a value, which is obtained by subtracting the present speed of the host vehicle from the calculated target speed, by an acceleration tuning parameter, through the required acceleration calculating device.

In this case, "S5007" may be performed through the controller described with reference to FIGS. 1 to 4D.

An embodiment of the present disclosure may provide an apparatus for controlling a speed of a vehicle and a method for the same, capable of controlling the vehicle to follow a speed limit based on an acceleration of the vehicle, which is calculated based on a traveling distance from a starting point of a speed trap, as well as the average speed of the vehicle.

Another embodiment of the present disclosure may provide an apparatus for controlling the speed of a vehicle, and a method for the same, capable of setting, as a target point, a point toward a starting point of a speed trap from an end point of the speed trap by a margin distance, and controlling the vehicle such that the average speed of the vehicle is equal to or less than a speed limit of the speed trap at a target point, thereby improving the inefficient use of the energy according to a related art of making the average speed of the vehicle to be less than or equal to the speed limit of the vehicle and then accelerating the vehicle, such that the energy is efficiently used, and the disharmony felt by the user is lowered.

Another embodiment of the present disclosure may provide an apparatus for controlling the speed of a vehicle, and a method for the same, capable of setting, as a starting point for maintaining a target speed, a point spaced to a starting point of a speed trap from a target point by a first distance, such that the vehicle maintains the speed of the vehicle after passing through the starting point for maintaining the target speed, thereby providing a stable driving experience to a user.

Another embodiment of the present disclosure may provide an apparatus for controlling the speed of a vehicle, and a method for the same, capable of consecutively calculating a target speed, based on at least one of a target distance, which is a distance extending from a starting point of a speed trap to a target point, a driving distance from the starting point of the speed trap, an average speed of a vehicle, or a remaining distance which is a distance from a present position of the vehicle to a target point, thereby precisely controlling the average speed of the vehicle.

Another embodiment of the present disclosure may provide an apparatus for controlling the speed of a vehicle and a method for the same, capable of setting a lower limit of a target speed as a target speed to ensure the safety of the user, when a calculated target speed has a positive value less than the lower limit of the target speed.

Besides, a variety of effects directly or indirectly understood through the disclosure may be provided.

The above description is merely an example of the technical idea of the present disclosure, and various modifications and modifications may be made by one skilled in the art without departing from the essential characteristic of the present disclosure.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling a speed of a vehicle, the method comprising:
   receiving, by a communication device, at least one of a starting point of a speed trap, an end point of the speed trap, a speed limit in the speed trap, an average speed of the vehicle, a traveling distance from the starting point of the speed trap of the vehicle, or a present speed of the vehicle;
   setting, by a target speed setting device, a target point based on the end point of the speed trap;
   setting, by the target speed setting device, a starting point for the target speed based on the set target point;
   determining, by the target speed setting device, whether the vehicle passes through the starting point for the target speed;
   calculating, by the target speed setting device, the target speed based on at least one of the starting point of the speed trap, the speed limit, the average speed, the traveling distance from the starting point of the speed trap, or the set target point
   calculating, by an acceleration calculating device, a required acceleration, based on the calculated target speed, the speed limit, a lower limit of the target speed, or the present speed of the vehicle; and
   controlling, by a controller, the vehicle, based on at least one of the calculated target speed or the calculated required acceleration,
   wherein calculating of the target speed includes calculating, by the target speed setting device, the target speed based on:
   i) a value obtained by dividing a target distance including a distance from the starting point of the speed trap to the set target point, by the speed limit,
   ii) a value obtained by dividing the traveling distance from the starting point of the speed trap by the average speed, and
   iii) a remaining distance, which is located within the speed trap, including a distance from a present position of the vehicle to the set target point.

2. The method of claim 1, wherein setting of the target point includes
   setting, by the target speed setting device, one of a point toward the starting point of the speed trap spaced apart from the end point of the speed trap by a margin distance or the end point of the speed trap, as the target point.

3. The method of claim 1, wherein setting of the starting point for the target speed includes:
   setting, by the target speed setting device, one of a point toward the starting point of the speed trap spaced apart from the target point by a first distance, or the target point, as the starting point for the target speed.

4. The method of claim 1, further comprising:
   calculating, by the acceleration calculating device, the required acceleration, based on at least one of the speed limit or the present speed of the vehicle; and
   controlling, by the controller, the vehicle based on at least one of the speed limit or the calculated required acceleration.

5. The method of claim 1, further comprising:
   calculating, by the acceleration calculating device, the required acceleration, based on at least one of a target speed calculated before the vehicle passes through the starting point for the target speed or the present speed of the vehicle; and
   controlling, by the controller, the vehicle, based on at least one of the target speed or the required acceleration,
   wherein the target speed or the required acceleration is calculated before the vehicle passes through the starting point for the target speed.

6. The method of claim 1, further comprising:
   calculating, by the acceleration calculating device, the required acceleration, based on at least one of the speed limit or the present speed of the vehicle; and
   controlling, by the controller, the vehicle, based on at least one of the speed limit or the calculated required acceleration.

7. The method of claim 1, further comprising:
   calculating, by the acceleration calculating device, the required acceleration, based on at least one of the lower limit of the target speed or the present speed of the vehicle; and
   controlling, by the controller, the vehicle, based on at least one of the lower limit of the target speed or the calculated required acceleration.

8. The method of claim 1, wherein calculating the required acceleration includes calculating, by the acceleration calculating device, a value, which is obtained by multiplying a value obtained by subtracting the present speed of the vehicle from the calculated target speed by an acceleration tuning parameter, as the required acceleration.

9. The method of claim 1, wherein determining whether the vehicle passes through the starting point for the target speed comprises determining that a distance from the starting point for the target speed to the end point of the speed trap is smaller or equal to a difference in distance between an entire distance of the speed trap and a distance the vehicle has passed since passing through the starting point.

10. An apparatus for controlling a speed of a vehicle, the apparatus comprising:
    a communication device configured to receive at least one of a starting point of a speed trap, an end point of the speed trap, a speed limit in the speed trap, an average speed of the vehicle, a traveling distance from the starting point of the speed trap of the vehicle, or a present speed of the vehicle;
    a target speed setting device configured to:
      set a target point based on the end point of the speed trap,
      set a starting point for a target speed based on the set target point, and
      calculate the target speed based on at least one of the starting point of the speed trap, the speed limit, the average speed, the traveling distance from the starting point of the speed trap, or the set target point when the vehicle has not passed through the starting point for the target speed;
    an acceleration calculating device configured to calculate a required acceleration based on at least one of the calculated target speed, the speed limit, a lower limit of the target speed, or the present speed of the vehicle; and a controller configured to control the vehicle based on at least one of the calculated target speed or the calculated required acceleration,
  wherein the target speed setting device is configured to calculate the target speed based on:
  i) a value obtained by dividing a target distance, which includes a distance from the starting point of the speed trap to the set target point, by the speed limit,
  ii) a value obtained by dividing the traveling distance from the starting point of the speed trap by the average speed, and
  iii) a remaining distance, which is located within the speed trap, including a distance from a present position of the vehicle to the set target point.

11. The apparatus of claim 10, wherein the target speed setting device is configured to set, as the target point, one of a point toward the starting point of the speed trap spaced apart from the end point of the speed trap by a margin distance or the end point of the speed trap.

12. The apparatus of claim 10, wherein the target speed setting device is configured to set, as the starting point for the target speed, one of a point toward the starting point of the speed trap spaced apart from the target point by a first distance, or the target point.

13. The apparatus of claim 10, wherein the acceleration calculating device is configured to calculate the required acceleration based on at least one of the speed limit or the present speed of the vehicle, and wherein the controller is configured to control the vehicle based on at least one of the speed limit or the calculated required acceleration when the target point is not set based on the end point of the speed trap.

14. The apparatus of claim 10, wherein the acceleration calculating device is configured to calculate the required acceleration, based on at least one of the target speed calculated before the vehicle passes through the starting point for the target speed or the present speed of the vehicle, and wherein the controller is configured to control the vehicle based on at least one of the target speed or the required acceleration when the vehicle is determined as passing through the starting point for the target speed, wherein the target speed or the required acceleration is calculated before the vehicle passes through the starting point for the target speed.

15. The apparatus of claim 10, wherein the target speed setting device is configured to determine that a distance from the starting point for the target speed to the end point of the speed trap is smaller or equal to a difference in distance between an entire distance of the speed trap and a distance the vehicle has passed since passing through the starting point.

16. The apparatus of claim 10, wherein the acceleration calculating device is configured to calculate the required acceleration based on at least one of the speed limit or the present speed of the vehicle, and wherein the controller is configured to control the vehicle based on at least one of the speed limit or the calculated required acceleration when the calculated target speed has no positive value or has a value greater than or equal to the speed limit.

17. The apparatus of claim 10, wherein the acceleration calculating device is configured to calculate the required acceleration based on at least one of the lower limit of the target speed or the present speed of the vehicle, and wherein the controller is configured to control the vehicle based on at least one of the lower limit of the target speed or the calculated required acceleration when the calculated target speed has a positive value less than the lower limit of the target speed.

18. The apparatus of claim 10, wherein the acceleration calculating device is configured to calculate, as the required acceleration, a value, which is obtained by multiplying a value, which is obtained by subtracting the present speed of the vehicle from the calculated target speed, by an acceleration tuning parameter.

* * * * *